(12) United States Patent
Jeong et al.

(10) Patent No.: US 12,600,220 B2
(45) Date of Patent: Apr. 14, 2026

(54) ELECTRIC VEHICLE BATTERY CASE TO FLOOR ATTACHMENT STRUCTURE

(71) Applicants: Hyundai Motor Company, Seoul (KR); Kia Corporation, Seoul (KR)

(72) Inventors: Seung Min Jeong, Hwaseong-si (KR); Gun Woo Ko, Seongnam-si (KR); Joo Nam Kim, Seoul (KR); Jong Wook Lee, Cheonan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 273 days.

(21) Appl. No.: 18/384,092

(22) Filed: Oct. 26, 2023

(65) Prior Publication Data

US 2024/0375501 A1 Nov. 14, 2024

(30) Foreign Application Priority Data

May 12, 2023 (KR) ........................ 10-2023-0061689

(51) Int. Cl.
| | |
|---|---|
| *B60K 1/04* | (2019.01) |
| *B62D 21/15* | (2006.01) |
| *B62D 25/02* | (2006.01) |
| *B62D 25/14* | (2006.01) |
| *B62D 25/20* | (2006.01) |
| *H01M 50/249* | (2021.01) |

(52) U.S. Cl.
CPC .............. *B60K 1/04* (2013.01); *B62D 21/152* (2013.01); *B62D 25/025* (2013.01); *B62D 25/145* (2013.01); *B62D 25/2036* (2013.01);

*H01M 50/249* (2021.01); *B60K 2001/0438* (2013.01); *H01M 2220/20* (2013.01)

(58) Field of Classification Search
CPC ...... B60K 1/04; H01M 50/249; H01M 50/20; H01M 50/242; H01M 2220/20; B62D 25/05; B62D 25/145; B62D 21/02; B62D 50/66
See application file for complete search history.

(56) References Cited

U.S. PATENT DOCUMENTS

| | | | | | |
|---|---|---|---|---|---|
| 5,501,289 | A | * | 3/1996 | Nishikawa ................ | B60K 1/04 280/783 |
| 11,752,853 | B2 | * | 9/2023 | Inoue ........................ | B60K 1/04 180/68.5 |
| 12,084,112 | B2 | * | 9/2024 | Park ......................... | B60K 1/00 |

FOREIGN PATENT DOCUMENTS

KR 10-2012-0074375 A 7/2012

* cited by examiner

*Primary Examiner* — Jason D Shanske
*Assistant Examiner* — James J Triggs
(74) *Attorney, Agent, or Firm* — Morgan, Lewis & Bockius LLP

(57) ABSTRACT

A battery case includes a floor panel of a vehicle, which forms a floor of a body of the vehicle and at the same time, forms an upper panel of a battery case, a side sill positioned at opposite sides of the floor panel, extending in a longitudinal direction of the vehicle, and extending downwardly from the floor panel in a height direction, and front and rear barriers extending downwardly from a front portion and a rear portion of the floor panel connected to the side sill to form a sidewall portion of the battery case together with the side sill by being connected to the side sill.

18 Claims, 6 Drawing Sheets

ELECTRIC VEHICLE BATTERY CASE TO FLOOR ATTACHMENT STRUCTURE

CROSS REFERENCE TO RELATED APPLICATION

The present application claims priority to Korean Patent Application No. 10-2023-0061689, filed on May 12, 2023, the entire contents of which is incorporated herein for all purposes by this reference.

BACKGROUND OF THE PRESENT DISCLOSURE

Field of the Present Disclosure

The present disclosure relates to a battery case, and more particularly, to a body of a vehicle provided as a battery upper case.

Description of Related Art

Recently, attraction has been paid on electric vehicles, hybrid electric vehicles, plug-in hybrid electric vehicles, etc., proposed as alternatives to solve various problems such as air pollution, etc., of conventional gasoline vehicles or diesel vehicles.

The electric vehicles are driven with power through secondary batteries unlike the conventional gasoline vehicles or diesel vehicles. Thus, to drive the electric vehicles, batteries having high capabilities such as high energy density, high output density, light weight, etc., and more batteries have to be disposed in the electric vehicles.

Meanwhile, conventionally, to form an electric vehicle, a body of the vehicle and a battery case for protecting a battery cell are separately manufactured, so that a process of combining the body of the vehicle with the battery case later is added to produce the electric vehicle.

However, when the body of the vehicle and the battery case are separately manufactured and assembled in the present way, a space where panels, etc., overlap is excessive, making it impossible to efficiently use a limited space of the vehicle and thus having to mount a small amount of battery cells thereon, resulting in reduction of a battery cruising distance.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery case, and more particularly, to a body of a vehicle provided as a battery upper case. The present disclosure aims to efficiently use a limited space of a vehicle by a body of the vehicle provided as a battery upper case through a battery case. The present disclosure also aims to propose a battery case configured for improving performance of an electric vehicle by mounting more battery modules thereon, and enhancing stability thereof by reinforcing connectivity between components of the body of the vehicle.

A battery case according to an exemplary embodiment of the present disclosure includes a floor panel of a vehicle, which forms a floor of a body of the vehicle and at the same time, forms an upper panel of a battery case, a side sill positioned at opposite sides of the floor panel, extending in a longitudinal direction of the vehicle, and extending downwardly from the floor panel in a height direction, and front and rear barriers extending downwardly from a front portion and a rear portion of the floor panel connected to the side sill to form a sidewall portion of the battery case together with the side sill by being connected to the side sill.

An upper cross member may be formed on a top surface of the floor panel to extend in a width direction of the vehicle and protrude upwardly.

The floor panel and the upper cross member may be molded integrally through an extrusion method.

Each of the floor panel and the upper cross member may be molded to include a closed cross section.

A lower cross member may be formed on a bottom surface of the floor panel to extend in a width direction of the vehicle and protrude downwardly.

Lower cross members may be formed spaced from each other, and a battery module may be positioned in a space where the lower cross members are formed spaced from each other.

The floor panel and the lower cross member may be molded integrally through an extrusion method.

A lower center member formed in the longitudinal direction of the vehicle and positioned in a center portion of a bottom surface of the floor panel may be formed on the bottom surface of the floor panel, and battery modules may be disposed with the lower center member therebetween.

A dash cross member extending upwardly may be formed in the front portion of the floor panel, and a front upper side member extending in the longitudinal direction of the vehicle to connect the dash cross member to the upper cross member may be formed on a top surface of the floor panel.

A rear cross member extending upwardly may be formed in the rear portion of the floor panel, and a rear upper side member extending in the longitudinal direction of the vehicle to connect the rear cross member to the upper cross member may be formed on a top surface of the floor panel.

An internal protrusion may be formed in a direction inwardly from the vehicle in the side sill, the internal protrusion may be positioned under the floor panel, and the side sill and the internal protrusion may be formed using an extrusion molding method to form a closed cross section.

The internal protrusion of the side sill may surface-contact with a lower cross member formed in a width direction of the vehicle on the bottom surface of the floor panel.

The battery case may further include a battery lower case, in which the battery lower case is coupled to the floor panel in a state of having the battery module mounted thereon, and in coupling of the battery lower case, an upper end portion of the internal protrusion of the side sill surface-contacts with the bottom surface of the floor panel and a lower end portion of the internal protrusion surface-contacts with the battery lower case.

An external protrusion may be formed in a direction outwardly from the vehicle in the side sill, and the external protrusion may extend in the longitudinal direction of the vehicle, and an upper end portion thereof may be positioned at the same height as or higher than the floor panel.

Front and rear barriers may be formed to include a closed cross section in the width direction of the vehicle, and opposite end portions of the barriers may be bent in a direction of a wheel housing of the vehicle.

The front and rear barriers may be formed by mechanical coupling between a center portion formed in the width direction of the vehicle and a bent portion formed to be bent in the direction of the wheel housing of the vehicle.

The battery case may further include a battery lower case including a plate coupled to the side sill and the front and rear barriers in a state including the battery module mounted thereon.

A mounting barrier may be formed to protrude upwardly and formed along an edge portion of the battery module while surrounding the battery module, on a top surface of the plate.

According to the battery case structure of the present disclosure, the floor panel forming the floor of the vehicle plays the role of the upper panel of the battery case integrally, thus eliminating the demand for a separate battery case upper panel, and the side sill of the vehicle plays the role of the sidewall portion required for securing the internal space of the battery case integrally, thus efficiently using the limited space of the vehicle.

The floor panel forming the floor of the body of the vehicle and the side sill of the body of the vehicle are connected to perform the role of the battery case. Therefore, there is no need for a separate cross member or mounting through-structure, etc. Inside the battery case, efficiently using the internal space of the battery case.

Furthermore, by integrating the battery upper panel and sidewall portion required to secure the internal space of the battery case, connectivity of the edge portion of the battery case may be reinforced. The body of the vehicle and the battery upper case are integrated, including more excellent structure connectivity than and superior stability over a case where the battery case and the vehicle are coupled through simple external bolting. Furthermore, when battery repair or inspection is required, only the battery lower case needs to be removed, making the process of battery repair and inspection much simpler.

When the external collision occurs due to the integration of the battery case and the body of the vehicle, dispersion of the impact may be facilitated, and the floor panel in charge of the battery case upper panel may form the closed cross-section structure, thus dispersing a load over the entire region of the floor panel in the event of a pole impact to minimize the thickness of the cross member unlike in the related art, securing the mounting space of the battery module and stability.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
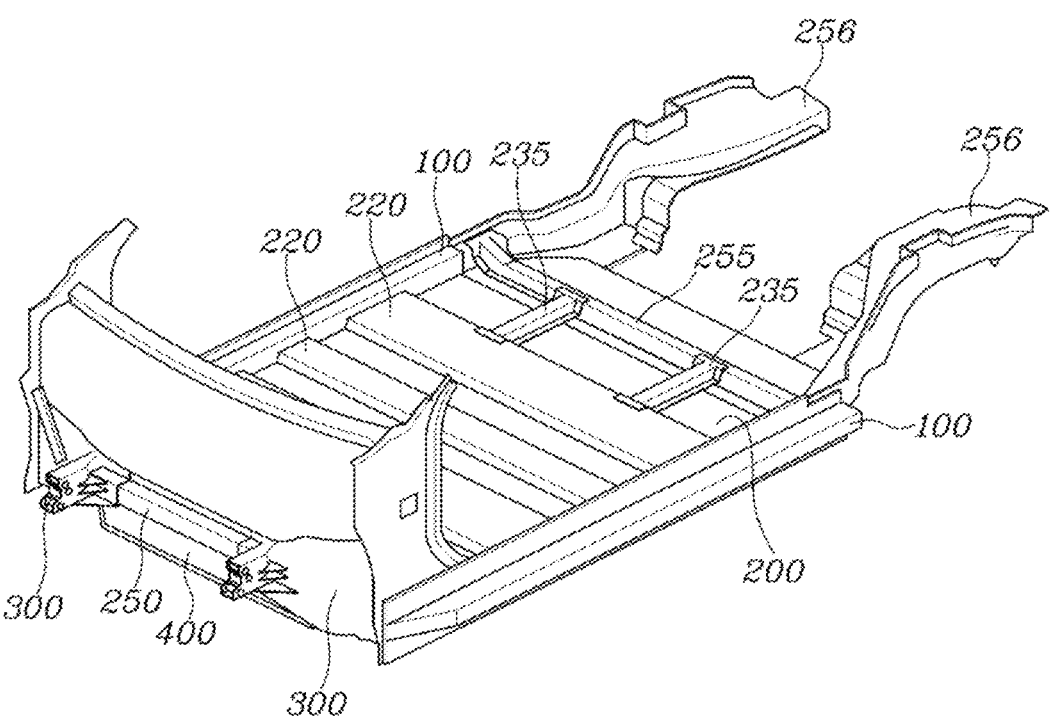
FIG. 1 illustrates a battery case according to various exemplary embodiments of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Figure 2:
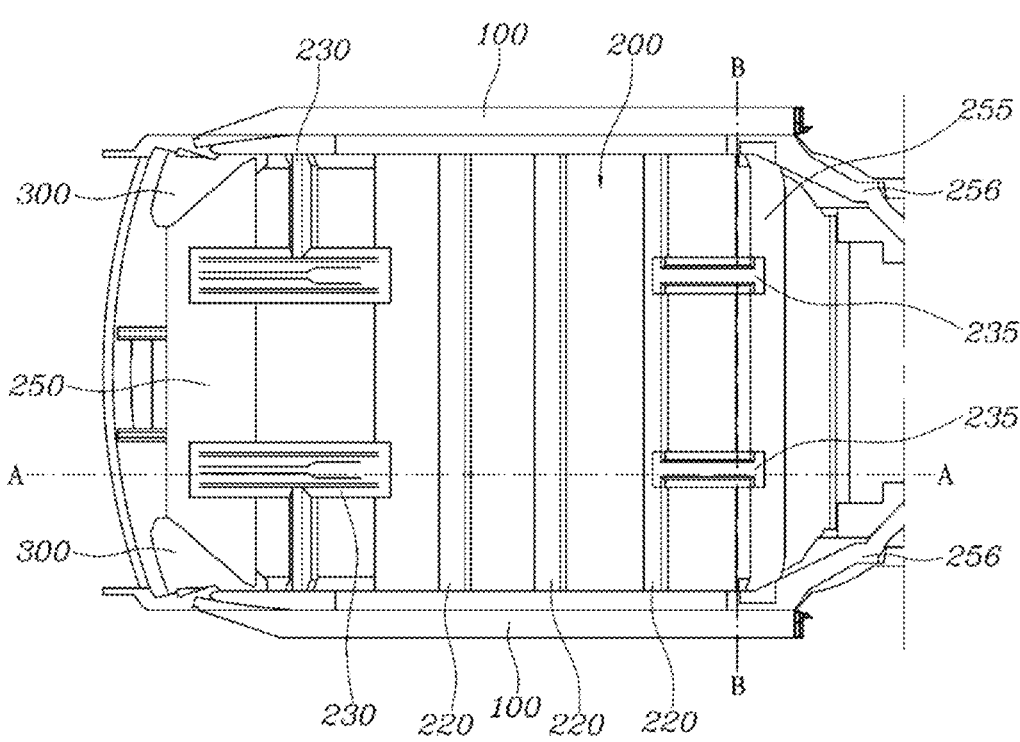
FIG. 2 is a view of the battery case of FIG. 1, viewed from top.
Figure 3:
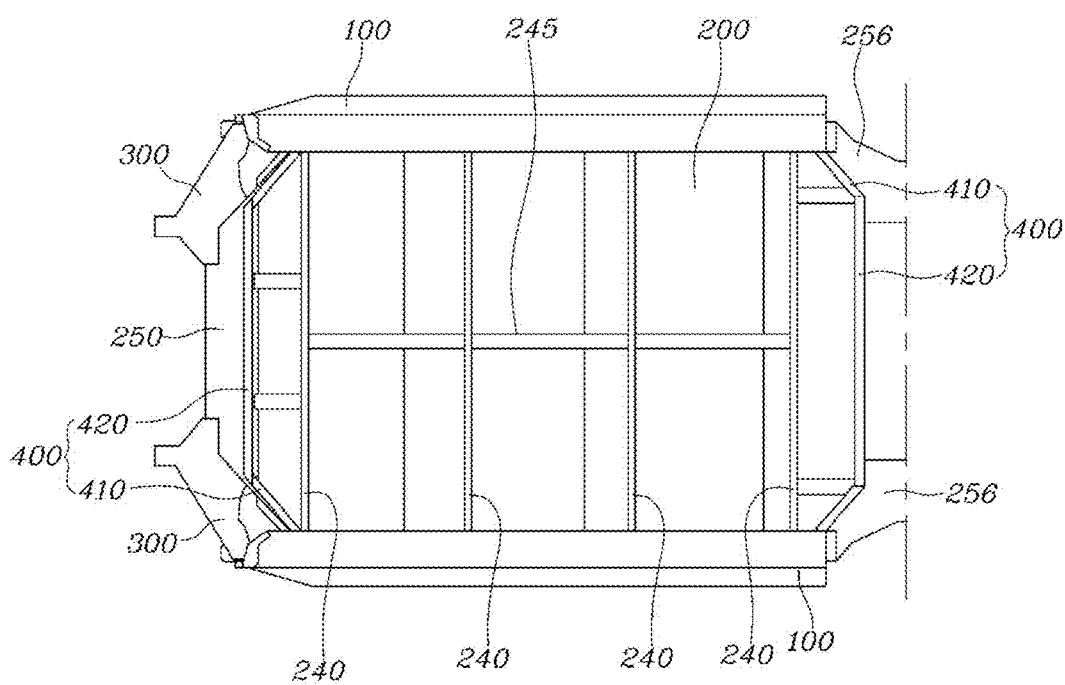
FIG. 3 is a view of the battery case of FIG. 1, viewed from bottom.
Figure 4:
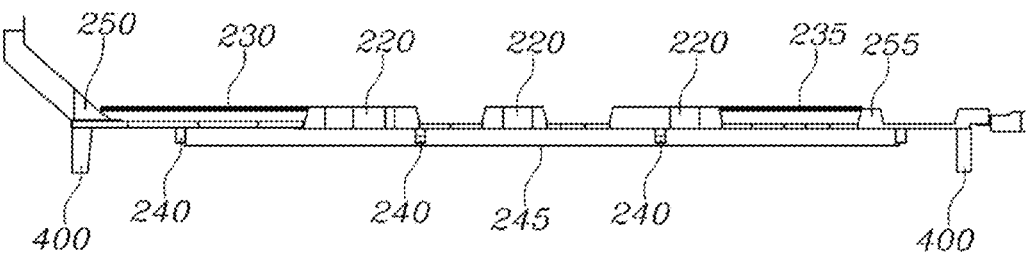
FIG. 4 is a cross-sectional view of the battery case of FIG. 2, cut along a line A-A.
Figure 5:
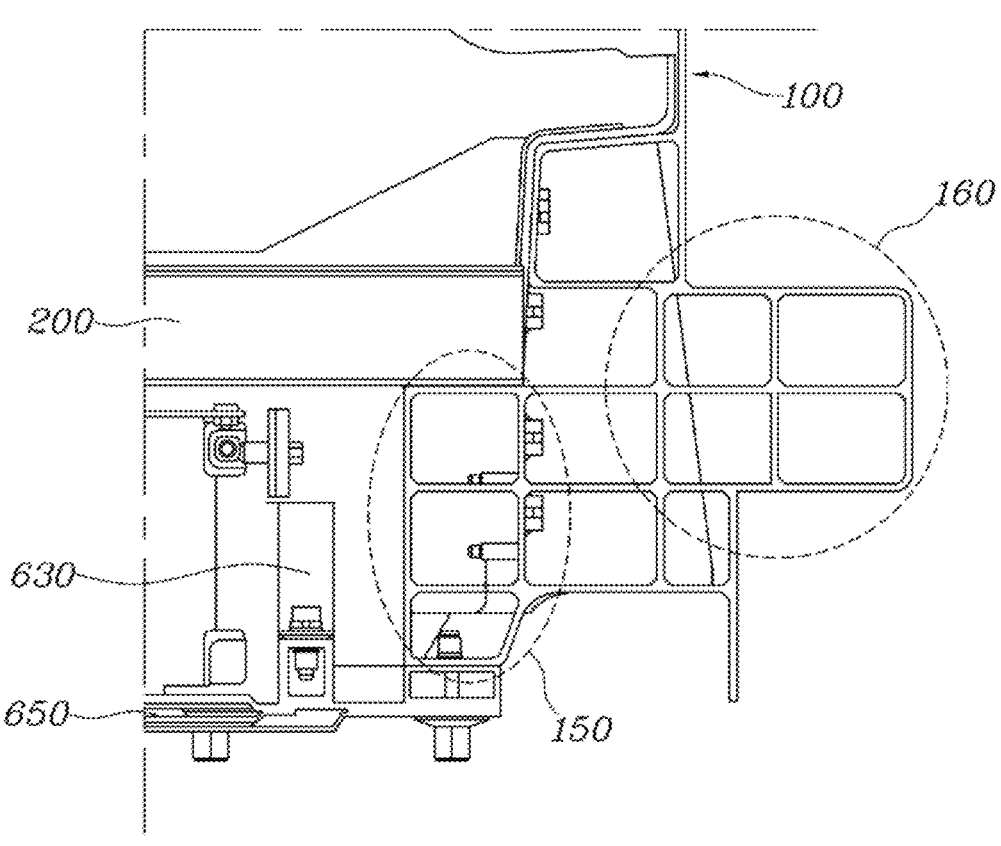
FIG. 5 is a cross-sectional view of a portion of a cross-section of the battery case of FIG. 2, cut along a line B-B.
Figure 6:
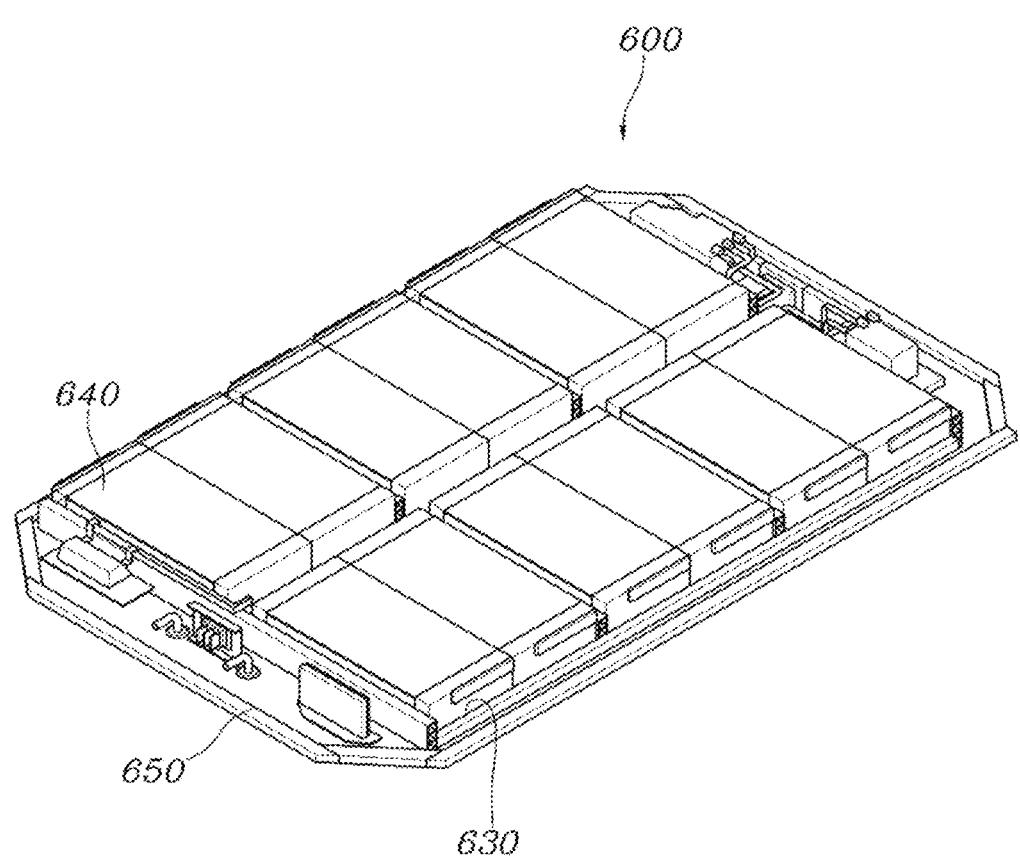
FIG. 6 illustrates a state in which a battery module is mounted on a battery lower case, according to various exemplary embodiments of the present disclosure.

FIG. 1 illustrates a battery case according to various exemplary embodiments of the present disclosure. FIG. 2 is a view of the battery case of FIG. 1, viewed from top. FIG. 3 is a view of the battery case of FIG. 1, viewed from bottom portion. FIG. 4 is a cross-sectional view of the battery case of FIG. 2, cut along a line A-A. FIG. 5 is a cross-sectional view of a portion of a cross-section of the battery case of FIG. 2, cut along a line B-B. FIG. 6 illustrates a state in which a battery module is mounted on a battery lower case, according to various exemplary embodiments of the present disclosure.

Hereinafter, detailed embodiments of the present disclosure will be described with reference to the accompanying drawings. However, this is only an example and the present disclosure is not limited thereto. A detailed description of related well-known techniques will be omitted when it unnecessarily obscures the subject matter of the present disclosure. Furthermore, the terminologies to be described below are defined in consideration of functions in an exemplary embodiment of the present disclosure and may vary depending on a user's or operator's intention or practice. Therefore, the terms should be defined based on the overall disclosure. The technical spirit of the present disclosure is determined by the claims, and the following embodiments are only a means for efficiently describing the technical spirit of the present disclosure to those of ordinary skill in the art to which an exemplary embodiment of the present disclosure belongs.

The present disclosure will be described with reference to FIG. 1, FIG. 2, FIG. 3, and FIG. 4. The battery case according to various exemplary embodiments of the present disclosure may include a floor panel 200 of a vehicle, which forms a floor of a body of the vehicle and at the same time, forms an upper panel of a battery case, side sills 100 which are located at opposite sides of the floor panel 200, extend in a longitudinal direction of the vehicle, and extend downwardly from the floor panel 200 in a height direction, and front and rear barriers 400 which forms a sidewall portion of the battery case together with the side sills 100 by being connected to the side sills 100.

Conventionally, to structure an electric vehicle, a body of the vehicle and a battery case for protecting a battery cell are separately manufactured so that a process of combining the body of the vehicle with the battery case later is added to combine the battery to the vehicle. However, when the body of the vehicle and the battery case are manufactured separately, an assembly gap between the battery upper case and the body of the vehicle needs to be secured and the facing floor of the vehicle and the battery upper case overlap, inevitably increasing an unnecessary thickness in the height direction thereof. However, a ground clearance of the vehicle needs to secure a defined height, thus elevating the floor of the vehicle and finally narrowing an internal space in the height direction thereof. On the other hand, with the present structure, a height occupied by the battery is inevitably limited to secure the internal space, degrading energy density. As a result, according to related art, the limited space of the vehicle may not be efficiently used, making it impossible to efficiently mount battery cells thereon.

Furthermore, according to related art, the battery case and the body may be coupled by simple external bolting, weakening connectivity between the battery case and the body and thus degrading stability. Moreover, a cross member is separately formed in the battery case and a through-bolt for fixing with the body is formed in the battery case, resulting in an insufficient mounting space of the battery module.

According to an exemplary embodiment of the present disclosure, the floor panel 200 of the body of the vehicle is configured as a vehicle body floor and at the same time as an upper panel of a battery case so that the floor panel 200 of the body of the vehicle is integrally configured as the battery upper case and the floor of the vehicle. Thus, a separate battery upper case is not required, removing a need to secure an assembly space for assembly the body of the vehicle and the battery case. Therefore, it is possible to use a space of the vehicle more efficiently and increase the energy density of the battery.

Furthermore, the body of the vehicle and the battery upper case are integrated, including more excellent structure connectivity than and superior stability over a case where the battery case and the vehicle are coupled through simple external bolting.

First, the floor panel 200 provided as a battery case upper panel will be described in detail. Referring to FIG. 1 and FIG. 2, a top surface of the floor panel 200 will be described. An upper cross member 220 may be formed on a top surface of the floor panel 200, which extends in a width direction of the vehicle and protrudes upwardly. A plurality of upper cross members 220 may be formed so that an impact may be dispersed in the event of collision, guaranteeing safety. A sheet of the vehicle may be mounted on the upper cross member 220.

The floor panel 200 and the upper cross member 220 according to an exemplary embodiment of the present disclosure may be molded integrally through an extrusion method. When they are molded integrally through the extrusion method, a process of separately molding the floor panel 200 and the upper cross member 220 and fixing them through welding, etc., is not required, thus being simplified and minimizing the number of parts. Moreover, when an extruded material is used, by differentiating cutting lengths, application to various types of vehicles may be possible, reducing the number of molds and facilitating a change of design, thus reducing a manufacturing cost. Moreover, through molding with one metal material instead of fixing separate parts, bonding strength between the parts may be improved, resulting in the more superior collision absorption effect.

Meanwhile, the floor panel 200 and the upper cross member 220 may be molded to have closed cross sections, respectively. Such closed cross section structures may be easily implemented through manufacturing using the above-described extrusion method. The closed cross section may form the cross section in various shapes and may be formed with a plurality of polygons as shown. By forming the closed cross section, resistance to bending in the event of an external impact may be increased.

A dash cross member 250 may be formed in a front portion of the top surface of the floor panel 200. The dash cross member 250 may protrude upwardly and extend in a width direction of the vehicle to be connected to the side sills 100 formed at the opposite sides of the floor panel 200. The dash cross member 250 may prevent an impact occurring due to forward collision from being applied to the battery. To the present end, effective impact dispersion is required. Thus, the dash cross member 250 may be connected to the side sills 100 to form a load path of a front portion of the battery case for efficient impact dispersion, improving stability of the battery case.

Moreover, the dash cross member 250 may be connected to the upper cross member 220 and front upper side members 230. The front upper side members 230 may extend in the longitudinal direction of the vehicle to connect the dash cross member 250 to the upper cross member 220. The front upper side members 230 may connect the dash cross member 250 to the upper cross member 220 to disperse an impact occurring due to front collision, improving stability of the battery case.

A rear cross member 255 may be formed in a rear portion of the top surface of the floor panel 200. The rear cross member 255 may protrude upwardly and extend in the width direction of the vehicle to be connected to rear side members 256 coupled to the rear portion of the floor panel 200. As the rear cross member 255 extends from the rear portion of the battery case in the width direction of the vehicle, rigidity in the width direction of the vehicle may be improved. The rear cross member 255 may also be connected to the rear side members 256 to effectively disperse an impact in the event of rear collision, enhancing stability of the battery case.

Moreover, the rear cross member 255 and the upper cross member 220 may be connected to rear upper side members 235. The rear upper side members 235 may extend in the longitudinal direction of the vehicle to connect the rear cross member 255 to the upper cross member 220. As the rear upper side members 235 are formed in the longitudinal direction of the vehicle, rigidity in the longitudinal direction of the vehicle may be improved. The rear upper side members 235 may connect the rear cross member 255 to the upper cross member 220 to disperse an impact occurring due to rear collision, improving stability of the battery case.

Next, referring to FIG. 3 and FIG. 4, a bottom surface of the floor panel 200 will be described. A lower cross member 240 may be formed on the bottom surface of the floor panel 200. The lower cross member 240 may extend in the width direction of the vehicle and protrude downwardly. A plurality of lower cross members 240 may be formed so that an impact may be dispersed in the event of collision, guaranteeing safety.

The plurality of lower cross members 240 may be spaced from each other in a space where a battery module 640 may be positioned. The battery module 640 may be positioned and fixed between the lower cross members 240, allowing the body of the vehicle to efficiently serve as the battery case. By dispersing an impact caused by external collision, the lower cross member 240 may be integrally configured to improve safety and at the same time, to fix the battery module 640. In the present way, as the lower cross member 240 plays an integral role, it is not necessary to form a separate cross member in the battery case as in the conventional case, allowing efficient use of an internal space of the battery case and reducing the number of assembly parts, allowing the body of the vehicle to efficiently serve as the battery case.

A lower center member 245 may be formed on the bottom surface of the floor panel 200. The lower center member 245 may be formed in the longitudinal direction of the vehicle and in the center portion of the bottom surface of the floor panel 200. The lower center members 245 may also be disposed with the battery module 640 therebetween, thus playing an integral role like the lower cross member 240. Moreover, the lower center member 245 may be formed to intersect the lower cross member 240, dispersing an impact in the longitudinal direction and width direction of the vehicle in case of application of the external impact and thus improving stability.

Meanwhile, the floor panel 200, the lower cross member 240, and the lower center member 245 according to an exemplary embodiment of the present disclosure may be molded integrally through the extrusion method. When the floor panel 200, the lower cross member 240, and the lower center member 245 are molded integrally through the extrusion method, a process of separately molding the floor panel 200, the lower cross member 240, and the lower center member 245 and fixing them through welding, etc., is not required, thus being simplified and minimizing the number of parts.

Moreover, the floor panel 200, the lower cross member 240, and the lower center member 245 may be molded to have closed cross sections, respectively. Such closed cross section structures may be easily implemented through manufacturing using the above-described extrusion method. by forming the closed cross section, resistance to bending in the event of an external impact may be increased.

Next, a sidewall portion forming the battery case together with the floor panel 200 will be described. The battery case may require an upper panel, a battery lower case 600, and a sidewall portion surrounding their edge portions to form the internal space. In an exemplary embodiment of the present disclosure, the upper panel of the battery case is configured as the floor panel 200 of the vehicle as described above. The sidewall portion of the battery case may also be integrated with the upper panel of the battery case. Through such integration of the sidewall portion, a load path between the sidewall portion and the body of the vehicle may be formed, more directly dispersing an impact through the body in the event of side collision.

The sidewall portion may be formed by the side sills 100 and the front and rear barriers 400. The side sills 100 may use original side sills forming the body of the vehicle. The side sills 100 are located at the opposite sides of the floor panel 200, and extend in the longitudinal direction of the vehicle, especially downwardly from the floor panel 200 in the height direction, thus forming opposite side surfaces of the sidewall portion of the battery case through the side sills 100 of the body. The front and rear barriers 400 may extend downwardly, respectively from the side sills 100 and the front portion and the rear portion of floor panel 200, and be connected to the side sills 100 so that the side sills 100 at the opposite sides and the front and rear barriers 400 may form the sidewall portion of the battery case.

With the present structure, side collision may be more effectively responded. Moreover, as the external portion of the battery case is integrally formed, connectivity between components may be excellent. Furthermore, with an integrated structure of the sidewall portion, when battery repair is required, only the battery lower case 600 may be removed, thus simplifying a repair process.

First, the side sill 100 forming the sidewall portion will be described in detail with reference to FIG. 5. The side sill 100 may be positioned at the opposite sides of the floor panel 200 and extend in the longitudinal direction of the vehicle and downwardly from the floor panel 200 in the height direction thereof. The side sill 100 may be positioned at the opposite sides of the floor panel 200 to respond to side collision and extend downwardly from the floor panel 200 in the height direction to form the sidewall portion of the battery case.

A front end portion of the side sill may be connected to a front side member 300 coupled to the front portion of the floor panel 200. As the front side member 300 and the side member 100 are connected, the load path of the body of the vehicle may be formed, efficiently dispersing an impact occurring in the event of front collision.

The side sill 100 may include an internal protrusion 150 in a direction inwardly from the vehicle, which is positioned under the floor panel 200. As the internal protrusion 150 of the side sill 100 is positioned under the floor panel 200, connectivity between the floor panel 200 and the side sill 100 may be improved.

The internal protrusion 150 is configured as an external structure corresponding to an impact required in a conventional battery case edge, an absorption space for absorbing the impact, etc. Therefore, a need to form separate edge structure and absorption space in the battery case is removed, increasing space utilization in the width direction of the vehicle. As a result, the internal protrusion 150 may increase a battery mounting space to improve energy density of the vehicle and thus enhance the performance of the vehicle. Furthermore, the internal protrusion 150 plays an integral role, reducing assembly parts.

Furthermore, the internal protrusion 150 may be formed in surface-contact with the lower cross member 240. As the internal protrusion 150 and the lower cross member 240 are formed in surface-contact with each other, connectivity between the side sill 100 and the floor panel 200 may be reinforced. In the event of external collision, the lower cross member 240 may prevent the side sill 100 from rotating in a clockwise direction to prevent the side sill 100 and the battery module 640 from colliding with each other, thus improving stability.

Moreover, an upper end portion of the internal protrusion 150 may surface-contact with the bottom surface of the floor panel 200 and a lower end portion thereof may surface-contact with the battery lower case 600 to fill an empty space between the floor panel 200 and the battery lower case 600. Thus, the internal protrusion 150 may be positioned on a side surface of the battery case, alleviating an impact applied to the side surface of the battery case in the event of side collision. Moreover, by completely filling a space between the floor panel 200 and the battery lower case 600 to reduce vibration occurring in battery driving, noise and discomfort caused by vibration may be mitigated, improving ride comfort.

An external protrusion 160 may be formed on an external side of the side sill 100 and extend in a longitudinal direction of the vehicle, and an upper end portion thereof may be positioned at the same height as or higher than the floor panel 200. As the external protrusion 160 is positioned at the same height as or higher than the floor panel 200, an impact applied to the floor panel 200 in the event of side collision may be absorbed, preventing damage or deformation of the floor panel 200.

Meanwhile, the side sill 100 may be molded integrally through the extrusion method. A process of separately manufacturing the internal protrusion 150 and the external protrusion 160 of the side sill and mechanically coupling them is not required, thus simplifying a process. Moreover, when the extruded material is used, application to various vehicle types may be possible by differentiating cutting lengths, enabling mass production.

Next, with reference to FIG. 3 and FIG. 4, the barriers 400 formed in the front portion and the rear portion forming the sidewall portion of the battery case will be described in detail. The front and rear barriers 400 may be formed by extending downwardly from the front portion and the rear portion of the floor panel 200.

The front and rear barriers 400 may form a closed cross-section in the width direction of the vehicle, and opposite end portions thereof may be formed to be bent in the direction of a wheel housing of the vehicle. A center portion 420 extending in the width direction of the vehicle and a bent portion 410 formed to be bent in the direction of the wheel housing are respectively molded by the extrusion method and then are mechanically coupled to each other to form the front and rear barriers 400. When the opposite end portions of the barriers 400 are formed to be bent in the direction of the wheel housing, the barrier 400 may be formed in the same structure as a structure made for the battery case upper panel to form the load path so that the barrier 400 may efficiently respond to an external impact by effectively protecting the battery module.

The opposite end portions of the front and rear barriers 400 may be connected to the side sill 100 to protect the battery module 640. Moreover, the barrier 400 positioned in the rear portion may be connected to the rear side member 256, thus reinforcing connectivity with the body of the vehicle and efficiently dispersing an impact.

The barrier 400 may be positioned in a front portion or a rear portion of the battery module 640 to prevent an impact from being applied to the battery module 640 in the event of collision, improving stability.

Last, referring to FIG. 6, the battery lower case 600, which is a component of the battery case, will be described. The battery lower case 600 may include a plate 650 including the battery module 640 mounted thereon. The battery module 640 may be mounted on the top surface of the plate 650 so that opposite side surfaces of the plate 650 are coupled to the side sill 100 and front and rear surfaces of the plate 650 are coupled to the front and rear barriers 400 to form an airtight structure. The battery lower case 600 according to an exemplary embodiment of the present disclosure, unlike a conventional battery case, may not include separate cross member and through-mounting structure formed therein, increasing a mounting space of a battery module and thus increasing energy density.

The battery lower case 600 may include a mounting barrier 630 that protrudes upwardly from the plate 650 and is formed along an edge portion of the battery module 640 while surrounding the mounted battery module 640. The mounting barrier 630 may be formed surrounding the battery module 640, reducing vibration occurring in driving of the battery module 640 and thus alleviating noise, discomfort, etc., occurring due to vibration. The mounting barrier 630 may protrude upwardly from the plate 650 and be formed along the edge portion of the battery module 640, securing hermeticity.

The battery lower case 600 may include electronic units required for controlling the battery system to manage temperature, voltage, etc., of the battery and thus promote stability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery case comprising:
a floor panel of a vehicle, which forms a floor of a body of the vehicle and an upper panel of a battery case;
a side sill positioned at opposite sides of the floor panel, extending in a longitudinal direction of the vehicle, and extending downwardly from the floor panel in a height direction of the vehicle; and
front and rear barriers extending downwardly from a front portion and a rear portion of the floor panel connected to the side sill to form a sidewall portion of the battery case together with the side sill by being connected to the side sill, wherein an upper cross member is formed on a top surface of the floor panel to extend in a width direction of the vehicle and protrude upwardly, and wherein a rear cross member extending upwardly is formed in the rear portion of the floor panel, and a plurality of rear upper side members extending in the longitudinal direction of the vehicle to connect the rear cross member to the upper cross member are formed on a top surface of the floor panel, wherein the plurality of rear upper side members are spaced apart from each other.

2. The battery case of claim 1, wherein the floor panel and the upper cross member are molded integrally through an extrusion method.

3. The battery case of claim 2, wherein each of the floor panel and the upper cross member is molded to include a closed cross section.

4. The battery case of claim 1, wherein a lower cross member is configured in plural and the lower cross member is formed on a bottom surface of the floor panel to extend in a width direction of the vehicle and protrude downwardly.

5. The battery case of claim 4, wherein lower cross members are formed spaced from each other, and a battery module is positioned in a space where the lower cross members are formed spaced from each other.

6. The battery case of claim 4, wherein the floor panel and the lower cross member are molded integrally through an extrusion method.

7. The battery case of claim 1, wherein a lower center member formed in the longitudinal direction of the vehicle and positioned in a center portion of a bottom surface of the floor panel is formed on the bottom surface of the floor panel, and battery modules are disposed with the lower center member therebetween.

8. The battery case of claim 1, wherein a dash cross member extending upwardly is formed in the front portion of the floor panel, and a front upper side member extending in the longitudinal direction of the vehicle to connect the dash cross member to the upper cross member is formed on a top surface of the floor panel.

9. The battery case of claim 1, wherein an internal protrusion is formed in a direction inwardly from the vehicle in the side sill, the internal protrusion is positioned under the floor panel, and the side sill and the internal protrusion are formed using an extrusion molding method to form a closed cross section.

10. The battery case of claim 9, wherein the internal protrusion of the side sill surface-contacts with a lower cross member formed in a width direction of the vehicle on a bottom surface of the floor panel.

11. The battery case of claim 9, further including a battery lower case, wherein the battery lower case is coupled to the floor panel having a battery module mounted thereon, and in coupling of the battery lower case, an upper end portion of the internal protrusion of the side sill surface-contacts with the bottom surface of the floor panel and a lower end portion of the internal protrusion surface-contacts with the battery lower case.

12. The battery case of claim 9, wherein an external protrusion is formed in a direction outwardly from the vehicle in the side sill, and the external protrusion extends in the longitudinal direction of the vehicle, and an upper end portion thereof is positioned at a same height as or higher than the floor panel.

13. The battery case of claim 1, wherein front and rear barriers are formed to include a closed cross section in a width direction of the vehicle, and opposite end portions of the front and rear barriers are bent in a direction of a wheel housing of the vehicle.

14. The battery case of claim 13, wherein the front and rear barriers are formed by mechanical coupling between a center portion formed in the width direction of the vehicle and a bent portion formed to be bent in the direction of the wheel housing of the vehicle.

15. The battery case of claim 1, further including a battery lower case including a plate coupled to the side sill and front and rear barriers including a battery module mounted thereon.

16. The battery case of claim 15, wherein a mounting barrier is formed to protrude upwardly and formed along an edge portion of the battery module while surrounding the battery module, on a top surface of the plate.

17. The battery case of claim 1, wherein a rear barrier positioned in the rear portion of the floor panel is connected to a rear side member.

18. The battery case of claim 1, wherein a front end portion of the side sill is connected to a front side member coupled to the front portion of the floor panel.

* * * * *